US009990956B2

(12) United States Patent
Shimada

(10) Patent No.: US 9,990,956 B2
(45) Date of Patent: Jun. 5, 2018

(54) RECORDING APPARATUS

(71) Applicant: TEAC CORPORATION, Tokyo (JP)

(72) Inventor: Hirotoshi Shimada, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days. days.

(21) Appl. No.: 15/222,388

(22) Filed: Jul. 28, 2016

(65) Prior Publication Data

US 2017/0033879 A1 Feb. 2, 2017

(30) Foreign Application Priority Data

Jul. 31, 2015 (JP) ................. 2015-151437

(51) Int. Cl.
*H04B 1/00* (2006.01)
*G11B 20/10* (2006.01)
(52) U.S. Cl.
CPC .......... *G11B 20/10* (2013.01); *H04R 2420/01* (2013.01)
(58) Field of Classification Search
CPC ....................................................... H04B 1/00
See application file for complete search history.

(56) References Cited

U.S. PATENT DOCUMENTS

| 5,185,680 A | 2/1993 | Kakubo |
| 7,119,267 B2* | 10/2006 | Hirade ............... G10H 1/08 |
| | | 381/119 |
| 2009/0177818 A1* | 7/2009 | Shim ................. G06F 3/14 |
| | | 710/100 |

FOREIGN PATENT DOCUMENTS

| JP | 2555743 B2 | 11/1996 |
| JP | 2001351366 A | 12/2001 |

\* cited by examiner

*Primary Examiner* — Olisa Anwah
(74) *Attorney, Agent, or Firm* — Seed Intellectual Property Law Group LLP

(57) ABSTRACT

In a recording system comprising a plurality of recording apparatuses connected in cascade to increase the number of audio channels, a desired audio signal can be monitored. In the recording apparatus, when a digital audio signal is input from a digital input terminal and an analog audio signal is input from an analog audio input terminal, the analog audio signal is converted to a digital signal, which is further embedded in the digital audio signal and output from an output terminal. When an operation unit designates a channel to be used for monitor output, among the digital audio signal input from a digital input terminal and a digital audio signal obtained by converting the analog audio signal to the digital signal, an audio signal of the channel which is designated is output for monitoring.

7 Claims, 2 Drawing Sheets

RECORDING APPARATUS

CROSS REFERENCE TO RELATED APPLICATION

The entire disclosure of Japanese Patent Application No. 2015-151437 filed on Jul. 31, 2015 including specification, claims, drawings and abstract is incorporated herein by reference in its entirety.

TECHNICAL FIELD

The present disclosure relates to a recording apparatus, and particularly to audio signal control for recording apparatuses connected in cascade.

BACKGROUND

Techniques for cascading a plurality of recording apparatuses to increase the number of audio channels which can be recorded have been known.

JP 2001-351366 A describes that one of a plurality of audio recorders which are connected via a serial transmission interface is set as a master recorder, so that operations of the remaining slave recorders are synchronized with the operation of the master recorder.

JP 2555743 B describes recording an audio signal with a reference clock of a master device being synchronized with a reference clock of a slave device. JP 2555743 B further describes that, when the number of channels to be used for recording is so great that it is not possible to record the signals in the tracks of a single tape recorder, a plurality of multitrack tape recorders are synchronized to enable recording, and a plurality of multitrack tape recorders are daisy chained.

As described above, it is possible to cascade (daisy chain) a plurality of recording apparatuses, among which one recording apparatus is designated as a master device while others are designated as slave devices, and to cause the slave devices to operate in conjunction with the operation of the master device, thereby increasing the number of audio channels. In such a configuration, however, in order to monitor (listen to) the audio signals recorded in the increased number of audio channels, a user must further connect a mixer and monitor the audio signals through the mixer, or monitor the audio signals individually by the respective devices, which is not convenient for users.

SUMMARY

According to the present disclosure, a plurality of recording apparatuses are cascaded to increase the number of audio channels, and a user can monitor a desired audio signal without the need to use other devices, such as a mixer, or to monitor the audio signals individually by the respective devices.

In accordance with one aspect of the present disclosure, a recording apparatus includes an m-channel analog audio input terminal, where m is a natural number that is 2 or greater, an n-channel digital input terminal, where n is greater than m (m<n) and is a natural number that is 4 or greater, an n-channel digital output terminal, an operation unit, and a controller. The controller may be configured to convert an analog audio signal input from the m-channel analog audio input terminal to a digital signal and embed the digital signal in a digital audio signal input from the n-channel digital input terminal to obtain a digital audio signal, and output the digital audio signal obtained by converting the analog audio signal to the digital signal, to the n-channel digital output terminal. The controller may also be configured to convert, among the digital audio signal input from the n-channel digital input terminal and the digital audio signal obtained by converting the analog audio signal to the digital signal, the digital audio signal of a channel which is designated by the operation unit as a channel to be used for monitor output, to an analog signal and output the analog signal.

In accordance with one embodiment, the digital input terminal may be an HDMI (registered mark) input terminal, and the digital output terminal may be an HDMI output terminal.

In accordance with another embodiment, the digital audio signal input from the n-channel digital input terminal has been output from the n-channel digital output terminal of another recording apparatus which is cascade connected with the recording apparatus.

According to the present disclosure, it is possible to connect a plurality of recording apparatuses in cascade to increase the number of audio channels, and to monitor a desired audio signal, without the need to use other devices, such as a mixer or monitor the audio signals individually by the respective devices.

BRIEF DESCRIPTION OF DRAWINGS

An embodiment of the present disclosure will be described by reference to the following figures, wherein.

DESCRIPTION OF EMBODIMENTS

An embodiment of the present disclosure will be described with reference to the drawings. The following embodiment will be described for illustrative purpose only and shall not limit the disclosure thereto.

Figure 1:
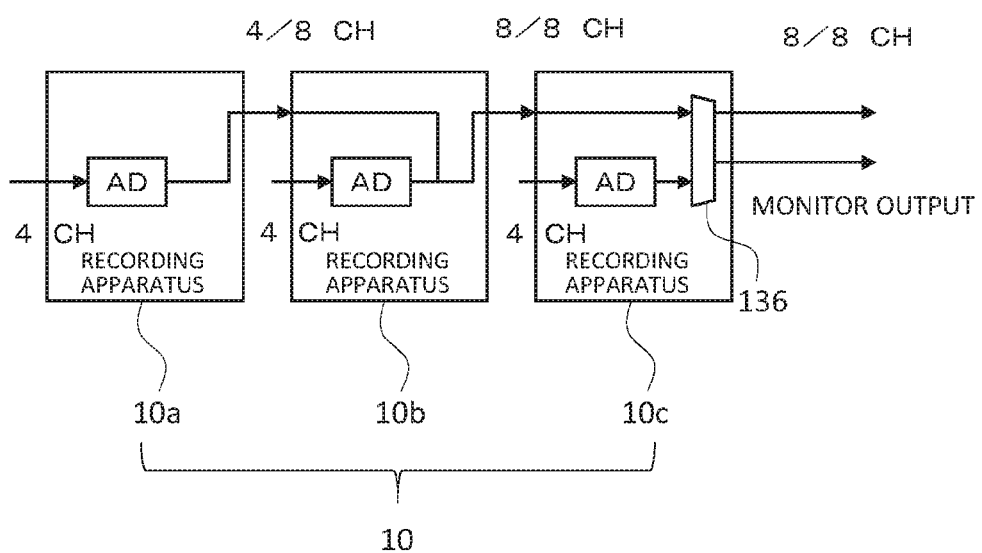
FIG. 1 is a diagram illustrating the structure of recording apparatuses which are cascaded according to an embodiment.

FIG. 1 is a diagram illustrating a structure of a system including a plurality of recording apparatuses 10 according to the present embodiment, which are connected in cascade. FIG. 1 illustrates an example in which three recording apparatuses 10, designated as a recording apparatus 10a, a recording apparatus 10b, and a recording apparatus 10c, respectively, are cascaded.

The recording apparatuses 10a, 10b, and 10c basically have the same structure and each includes an operation unit, an AD (analog to digital converter), a multiplexer (MUX), a CPU, a memory, and High-Definition Multimedia Interface (HDMI) input and output terminals. The recording apparatuses 10a, 10b, and 10c are connected via wired or wireless HDMI. FIG. 1 illustrates an example in which the recording apparatuses 10a, 10b, and 10c are connected via an HDMI cable. Each of the recording apparatus 10a, 10b, and 10c is a PCM (Pulse Code Modulation) recorder, which records an audio signal in a linear PCM WAV format which is not lossy compression. Each recording apparatus may adopt a lossy compression format such as MP3, for example.

Each of the recording apparatuses 10a, 10b, and 10c also includes an analog audio input terminal for receiving input of a four-channel analog audio signal.

The first recording apparatus 10a receives an input of a four-channel analog audio signal, which is then converted by the AD into a digital audio signal and is supplied, via a multiplexer not shown, to the second recording apparatus 10*b*, as an HDMI signal, through the HDMI cable. The HDMI supports eight channels of audio channel, and the digital audio signal is embedded in four channels out of the eight channels, which is expressed as 4/8 CH in FIG. 1.

The second recording apparatus 10*b* receives input of another four-channel analog audio signal, which is further converted into a digital audio signal by the AD. The second recording apparatus 10*b* then embeds the digital audio signal, by the multiplexer which is not shown, in the four-channel audio signal contained in the HDMI signal supplied from the first recording apparatus 10*a*, and further supplies the resultant audio signal, as an HDMI signal, to the third recording apparatus 10*c* via the HDMI cable. Because, in addition to the four-channel audio signal from the first recording apparatus 10*a*, a further four-channel audio signal is embedded, an audio signal of a total of eight channels; that is, 8/8 CH, is supplied to the third recording apparatus 10*c*.

The third recording apparatus 10*c* receives a further four-channel analog audio signal, which is further converted by the AD into a digital audio signal. The third recording apparatus 10*c* further supplies this digital audio signal, along with the audio signal of eight channels contained in the HDMI signal supplied from the second recording apparatus 10*b*, to a multiplexer 136. The multiplexer 136, in response to an operation by a user, selects, from the audio signal of total of twelve channels, the audio signal of two channels to be monitored and the audio signal of eight channels to be supplied to a device connected further downstream. The two-channel audio signal to be monitored is converted to an analog audio signal, which is then externally output as a monitor output. The eight-channel audio signal is supplied, as an HDMI signal, to an HDMI device located further downstream.

Figure 2:
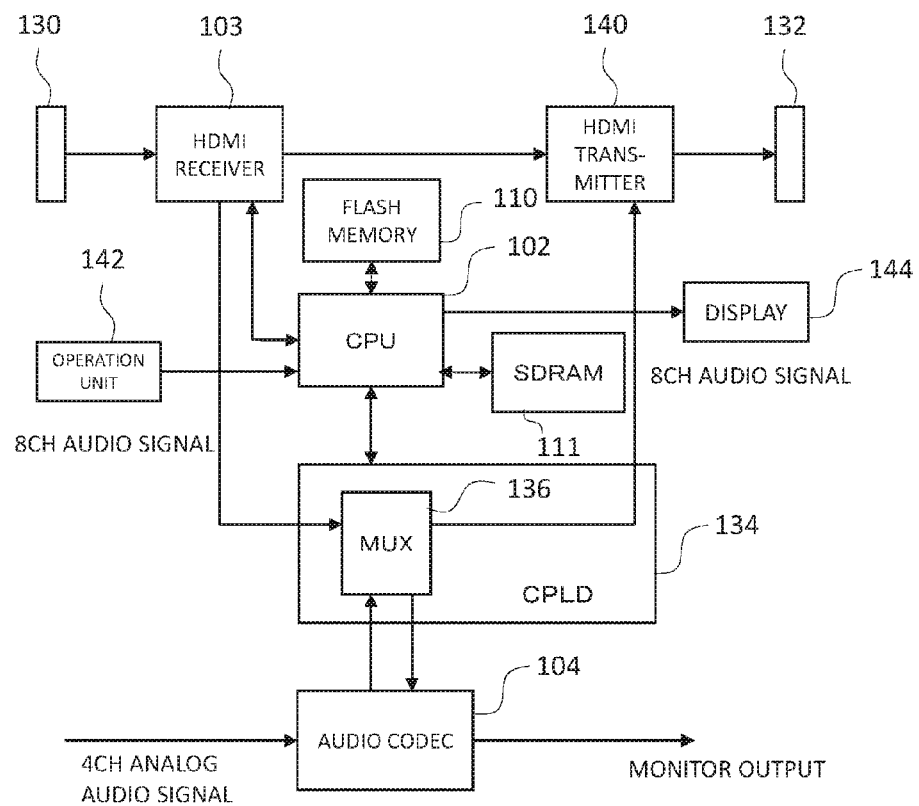
FIG. 2 is a block diagram illustrating the structure of a recording apparatus according to an embodiment.

FIG. 2 is a block diagram illustrating the structure of a recording apparatus 10 (recording apparatus 10*a*, 10*b*, 10*c*) according to the present embodiment. The recording apparatus 10 includes an HDMI input terminal (HDMIIN) 130, an HDMI output terminal (HDMIOUT) 132, a HDMI receiver 103, an HDMI transmitter 140, a CPU 102, a complex programmable logic device (CPLD) 134, an audio CODEC 104, and a multiplexer (MUX) 136. According to the present embodiment, the CPU 102, the CPLD 134, and the audio CODEC 104 function as a controller.

The HDMI input terminal 130 is connected, via the HDMI cable, to another recording apparatus 10.

The HDMI receiver 103 receives a Transition Minimized Differential Signaling (TMDS) signal and a TMDS clock signal transmitted from another recording apparatus 10 via the HDMI cable and extracts and outputs an LRCK signal (Left Right Clock), a Base Clock (BCLK) (or Serial Clock (SCLK)) signal, a data signal, and a Master Clock (MCLK) signal. The CPU 102 is connected to the HDMI receiver 103 through an I2C bus to control the operation of the HDMI receiver 103. The HDMI receiver 103 supplies the audio signal contained in the data signal to the CPLD 134.

The CPLD 134 outputs the audio signal to the multiplexer (MUX) 136. Meanwhile, a four-channel analog audio signal input through a microphone, for example, is converted, by the audio CODEC 104, to a digital signal, which is then supplied to the CPLD 134. A CPLD is a programmable logic device and is configured by a nonvolatile memory on a chip. For convenience of explanation, an audio signal contained in an HDMI signal will be hereinafter referred to as an HDMI audio signal so as to be distinguished from an audio signal input through a microphone, for example, which will hereinafter be referred to as an input audio signal.

An operation unit 142 is composed of a button, selector, or touch switch, for example, which can be operated by a user. Specifically, the user operates the operation unit 142 to detect presence of a monitor output and select an audio channel to be monitored. An operation signal output from the operation unit 142 is supplied to the CPU 102.

The CPU 102 reads a processing program and executes predetermined processing, using a flash memory 110 and an SDRAM 111 which serve as a program memory and a working memory, respectively. Specifically, the CPU 102 stores audio data in an SD card memory mounted on an SD card connector, which is not shown. The CPU 102 further controls the multiplexer 136 of the CPLD 134, in response to the operation signal from the operation unit 142, and embeds an input audio signal in an HDMI audio signal. Alternatively, the CPU 102, in response to the operation signal from the operation unit 142, selects an audio signal of a channel to be monitored from the HDMI audio signal and the input audio signal and outputs the selected audio signal to the audio CODEC 104, and further selects an eight-channel HDMI audio signal to be supplied to a device located further downstream and outputs the selected signal to the HDMI transmitter 140.

The HDMI transmitter 140 outputs a TMDS signal including the HDMI audio signal and a TMDS clock signal to another device, such as another recording apparatus 10, for example, via the HDMI output terminal 132.

The audio CODEC 104 executes various processes including AD conversion and coding with respect to the analog audio signal which is input, and stores and records the resultant signal, via the CPU 102, in an SD card memory. The audio CODEC 104 also reads the audio data stored in the SD card memory via the CPU 102, and applies decoding and DA conversion to the audio data and outputs the resultant signal as an analog audio signal. The audio CODEC 104 further converts an audio signal for monitoring supplied from the multiplexer 136 to an analog signal and externally outputs the analog signal as a monitor output.

A display 144 is composed of a liquid crystal panel or an organic EL panel, for example, and, in response to an instruction from the CPU 102, shows the state of monitor selection determined by the operation of the operation unit 142 and the state in which the HDMI audio signals are assigned to the channels.

The specific operation of the recording apparatus according to the present embodiment will be described below.

It is now assumed, in accordance with the structure illustrated in FIG. 1, that three recording apparatuses 10*a*, 10*b*, and 10*c* are connected in cascade via the HDMI cable.

In this configuration, it is also assumed that, in each of the first recording apparatus 10*a* and the second recording apparatus 10*b*, the operation unit 142 turns OFF the monitor output, whereas, in the third recording apparatus 10*c*, the operation unit 142 turns ON the monitor output. The ninth channel and the tenth channel are selected as channels to be monitored, and the first to eighth channels are assigned as audio channels of the HDMI signal.

In this state, as the monitor output of the first recording apparatus 10*a* is turned OFF, the CPU 102 of the first recording apparatus 10*a* embeds a four-channel (or fewer channel) input audio signal, by the multiplexer 136, in the audio channels of the HDMI signal, and outputs the resultant audio signal to the HDMI transmitter 140. Embedding is performed sequentially for the eight channels of the audio channels, starting from the first channel. A four-channel input audio signal is therefore embedded in the first to fourth channels.

Further, as the monitor output of the second recording apparatus 10b is turned OFF, the CPU 102 of the second recording apparatus 10b embeds a four-channel (or fewer channel) input audio signal, by the multiplexer 136, in the audio channels of the HDMI signal, and outputs the resultant audio signal to the HDMI transmitter 140. As the audio signal has been already embedded in the first to fourth channels by the first recording apparatus 10a, the input audio signal is embedded by the second recording apparatus in the fifth to eighth channels.

In the third recording apparatus 10c, on the other hand, as the monitor output is ON, the ninth channel and the tenth channel are selected as channels to be monitored, and the first channel to the eighth channels are assigned as the audio channels for the HDMI signal, the CPU 102 of the third recording apparatus 10c causes the multiplexer 136 to select the audio signals of the ninth channel and the tenth channel among the four-channel (or less channel) input audio signal and output the resulting audio signal to the audio CODEC 104 and also to output an HDMI audio signal of eight channels to the HDMI transmitter 140. The display 144 of the third recording apparatus 10c, in response to the operation of the operation unit 142, indicates that the audio signal of the ninth channel and the audio signal of the tenth channel are output as monitor output, and the first to eighth channels are assigned as the eight channels of the HDMI audio signal.

When the user operates the operation unit 142 of the third recording apparatus 10c to select the first channel and the second channel as channels to be monitored, the CPU 102, in response to the operation of the operation unit 142, controls the multiplexer 136 to select the audio signals of the first and second channels from the HDMI audio signals and output the selected signals to the audio CODEC 104. As such, while the audio signals of the first and second channels are input by the first recording apparatus 10a, it is possible to monitor these audio signals by the third recording apparatus 10c. Also, when the user operates the operation unit 142 to select the fifth channel and the sixth channel as channels to be monitored, the CPU 102, in response to the operation from the operation unit 142, controls the multiplexer 136 to select the audio signals of the fifth and sixth channels from the HDMI audio signals and output the signals to the audio CODEC 104. As such, while the audio signals of the fifth channel and the sixth channel are input by the second recording apparatus 10b, it is possible to monitor these audio signals by the third recording apparatus 10c.

As described above, according to the present embodiment, a plurality of recording apparatuses 10 can be connected in cascade, and each recording apparatus 10 is configured to include the operation unit 142 to enable selection of ON/OFF of monitor output and an audio channel to be used for monitor output, so that, in the recording apparatus 10 in which monitor output is turned ON, the CPU 102 controls the multiplexer 136 to select audio signals of the designated channels from audio signals of a plurality of channels for monitor output. It is therefore possible to monitor the audio signal of a desired channel only by the recording apparatus 10 located at the last stage in the cascade (the recording apparatus 10c in the example illustrated in FIG. 1), without the need to connect another mixer, for example, for monitoring or the need to monitor the audio signal individually with each device.

It should be noted that when the user operates the operation unit 142 of the second recording apparatus 10b to turn the monitor ON, the user can monitor either the input audio signal of the first recording apparatus or the input audio signal of the second apparatus.

While, in the above-described example, three recording apparatuses 10a, 10b, and 10c are connected, the present disclosure is not limited to this example, and two recording apparatuses or four or more recording apparatuses, as required, may be connected in cascade. With one of the cascaded recording apparatuses 10 being set as a master device (the recording apparatus 10a, for example) while other devices being set as slave devices, the operation of the slave devices may be synchronized with the operation of the master device. Further, while in the above-described example, the audio channel in which an input audio signal is to be embedded has been set in advance in each of the recording apparatus 10a, 10b, and 10c, the recording apparatus 10a, 10b, and 10c may be configured such that the CPU 102 detects a channel of the HDMI audio channels in which an audio signal has been embedded and embeds an input audio signal in the channels other than the detected channel.

Also, while the above-described embodiment describes an example in which a plurality of recording apparatuses 10 are connected with an HDMI method, this is only an example and the recording apparatuses 10 may be connected by another connection method (e.g., MADI). While the above-described embodiment, based on the assumption that recording apparatuses are HDMI connected, describes a recording apparatus 10, which is a four-channel recorder with up to eight-channel digital input and output, the number of channels is not limited to this example. In general, in a recording apparatus which is a m-channel recorder having up to n-channel digital input/output (where m<n: m is a natural number which is 2 or greater and n is natural number which is 4 or greater), example combinations of m and n which are applicable to such a recording apparatus may include (m, n)=(2, 4), (2, 8), (4, 8), and (4, 12), for example.

The invention claimed is:

1. A recording apparatus, comprising:
an m-channel analog audio input terminal, where m is a natural number that is 2 or greater;
an n-channel digital input terminal, where n is greater than m (m<n) and is a natural number that is 4 or greater;
an n-channel digital output terminal;
an operation unit; and
a controller configured to convert an analog audio signal input from the m-channel analog audio input terminal to a digital signal and embed the digital signal in a digital audio signal input from the n-channel digital input terminal to obtain a digital audio signal, and output the digital audio signal obtained by converting the analog audio signal to the digital signal to at least one channel of the n-channel digital output terminal and output the digital audio signal input from the n-channel digital input terminal to one or more channels of the n-channel digital output terminal the at least one channel of the n-channel digital output terminal being different from the one or more channels of the n-channel digital output terminal, and configured to convert, among the digital audio signal input from the n-channel digital input terminal and the digital audio signal obtained by converting the analog audio signal to the digital signal, the digital audio signal of a channel which is designated by the operation unit as a channel to be used for monitor output, to an analog signal and output the analog signal.

2. The recording apparatus according to claim 1, wherein the digital input terminal is an HDMI input terminal; and the digital output terminal is an HDMI output terminal.

3. The recording apparatus according to claim 1, wherein
the digital audio signal input from the n-channel digital input terminal has been output from the n-channel digital output terminal of another recording apparatus which is cascade connected with the recording apparatus.

4. The recording apparatus according to claim 1, wherein
the controller comprises a programmable logic device,
the programmable logic device comprises a multiplexer, and
the multiplexer embeds the digital signal, obtained by conversion of the analog audio signal, in the digital audio signal input from the n-channel digital input terminal.

5. The recording apparatus according to claim 1, wherein
the controller comprises a processor and a programmable logic device, and
the programmable logic device, in accordance with a control signal supplied from the processor, embeds the digital signal, obtained by conversion of the analog audio signal, in the digital audio signal input from the n-channel digital input terminal.

6. The recording apparatus according to claim 1, wherein
the controller comprises a processor, a programmable logic device, and a CODEC, and
the programmable logic device, in accordance with a control signal supplied from the processor, embeds the digital signal, obtained by conversion of the analog audio signal, in the digital audio signal input from the n-channel digital input terminal, and
the CODEC converts the analog audio signal to the digital signal, and, among the digital audio signal input from the n-channel digital input terminal and the digital audio signal obtained by converting the analog audio signal to the digital signal, converts the digital audio signal of the channel which is designated to an analog signal.

7. A recording system comprising:
a plurality of recording apparatuses connected in cascade, each of the recording apparatuses including:
an m-channel analog audio input terminal, where m is a natural number that is 2 or greater;
an n-channel digital input terminal, where n is greater than m (m<n) and is a natural number that is 4 or greater;
an n-channel digital output terminal;
an operation unit; and
a controller configured to convert an analog audio signal input from the m-channel analog audio input terminal to a digital signal and embed the digital signal in a digital audio signal input from the n-channel digital input terminal to obtain a digital audio signal, and output the digital audio signal obtained by converting the analog audio signal to the digital signal to at least one channel of the n-channel digital output terminal and output the digital audio signal input from the n-channel digital input terminal to one or more channels of the n-channel digital output terminal, the at least one channel of the n-channel digital output terminal being different from the one or more channels of the n-channel digital output terminal, and configured to convert, among the digital audio signal input from the n-channel digital input terminal and the digital audio signal obtained by converting the analog audio signal to the digital signal, the digital audio signal of a channel which is designated by the operation unit as a channel to be used for monitor output, to an analog signal and output the analog signal.

* * * * *